UNITED STATES PATENT OFFICE.

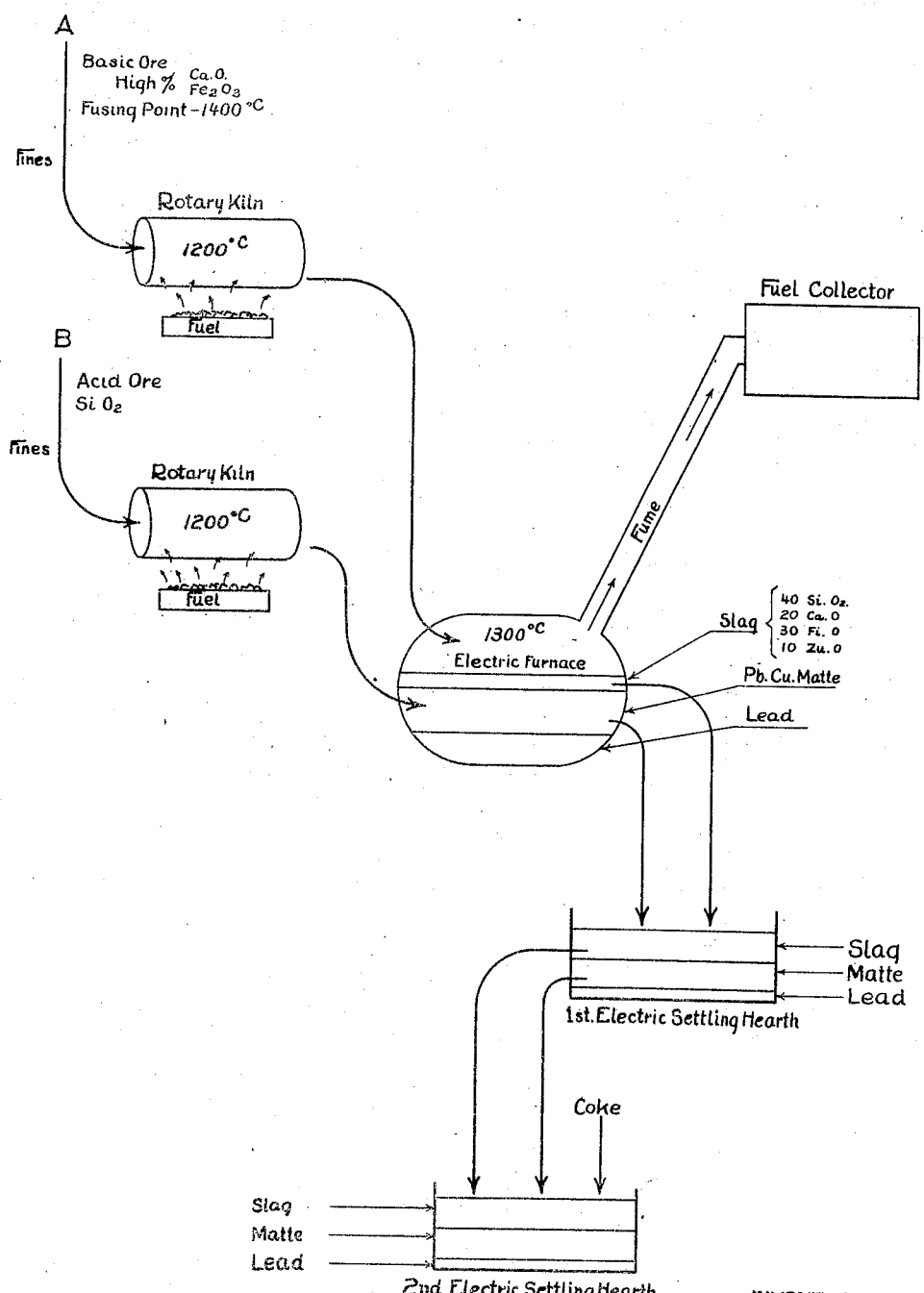

WOOLSEY McALPINE JOHNSON, OF HARTFORD, CONNECTICUT.

COPPER-LEAD-SMELTING PROCESS.

1,333,720.      Specification of Letters Patent.      Patented Mar. 16, 1920.

Applicaton filed October 24, 1914. Serial No. 868,488.

*To all whom it may concern:*

Be it known that I, WOOLSEY McA. JOHNSON, a citizen of the United States, and residing at Hartford, in the county of Hartford and State of Connecticut, have invented a new and Improved Copper-Lead-Smelting Process, of which the following specification is a full disclosure.

This invention deals with a combination smelting system suitable for lead-copper ores and devised to operate under conditions of maximum efficiency by selectively utilizing the thermal energy of fuel and of electricity.

As a general proposition, coke is expensive in mining centers, whereas soft-coal is comparatively cheap; yet the coke is used for the reason that it enables smelting to be done in a shaft furnace, which is a good metallurgical instrument. Electricity, however, can be utilized in such a way as to be more efficient for temperatures above 1100° C., for it is a powerful heating and metallurgical agent enabling one to put heat just where desired when its conditions of use are fully understood and when it is rightly applied.

My new process comprehends the heating (by the flame of combustion of soft-coal) two kinds of oxidized ores in two separate rotary furnaces (e. g., hot calcined or naturally oxidized ore), with such additions of such ingredients as may be necessary and suitable.

My new process will be understood by reference to the accompanying diagrammatic drawing and in connection with the following disclosure.

The first of these mixtures (A) is made or selected so as to contain a large percentage of metallic oxids, such as $CaO Fe_2O_3$, and it is relatively basic and therefore has a high fusing point. Provided 20% CaO is present, the fusing point of this mixture will be about 1400° C. I sinter such material in a rotary furnace, similar to a cement kiln and fired either with oil, coaldust or gas. The other mixture (B) is made principally of silicious material and likewise has a high fusing point. As in case of the mixture (A), the finishing temperature is below the fusing temperature by a safe margin. The operation of mixture (B) is likewise carried on in a rotary furnace.

If these two were heated together, a semi-fused mass that would not feed would be made. Accordingly, mixture (A) is fed with mixture (B) into an electric furnace preferably of the "buried-arc" type in which the electrode is submerged in the slag and the charge. These mixtures (A) and (B) are fed into the electric furnace in such proportions that a slag will be made analyzing about:

$SiO_2$ ---------------------- 40%
$CaO$ ---------------------- 20%
$FeO$ ---------------------- 30%
$ZnO$ ---------------------- 10%

In this operation, lead bullion and copper matte will be produced and will be removed from the furnace in the same manner as in a lead blast-furnace. The slag and matte will be passed through two electrically heated settling-hearths. In the first settler, the matte will be tapped out at intervals while the slag (partially freed from matte) passes to the second settler. In the second settler, some fine carbonaceous material, such as coke from a gas producer or fire box, is added to reduce the contained ZnO from about 10% to about 1%; and to increase the reductivity of this auxiliary smelting zone so that it may also reduce any dissolved CuO or PbO. No special attempt need be made to reduce the zinc vapor to spelter, although from 15% to 35% of the zinc vapor will be condensed to spelter under the conditions prevailing. Preferably, the vapor is mainly condensed to impure blue-powder. This can be sold as a raw material or can be electrically smelted on the spot to make spelter.

In case much lead is present in (A) or in (B) and in case an extremely high temperature is used, it will be necessary to use a bag-house or Cottrell apparatus to precipitate any of the lead passing away as fume. In certain instances, it will be advisable to make a third mixture C; using a separate third pre-heater, which is high in lead, (or for example lead concentration) and which is subjected to only such a temperature (600° C.) that no commercial loss of lead can ensue. This does away with expensive dust and fume collecting devices.

In certain cases, as where no lead is present in ore, percentages of copper oxid and of copper sulfid are so proportioned that this reaction takes place—

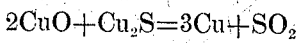
$$2CuO+Cu_2S=3Cu+SO_2$$

and a copper bullion is thus made directly from ore. In that event, the slag in the forehearth is given a sprinkling of low-grade copper pyrites charged with coil to clean the slag of any copper pellets contained in it by making a low-grade matte in said forehearth; a slag containing an excess of iron sulfid is much cleaner than a slag without appreciable sulfid present.

The electricity is used only in small amounts. Assuming the smelting is conducted at 1300° C., and that the pre-heating is done at 1200° C., the net electrothermal requirements per metric ton will be low since considerable heat is evolved, in fact enough to carry on all the smelting work, and the electrical heat is only supplied to increase the smelting rate by increasing the working temperature of the smelting zone above the critical temperatures at which the reactions start. The electricity thus plays a rôle in my process similar to that played by small percentage of coke in pyritic smelting, only in a much more effectual manner.

In the matter of the composition of the slag, my process has an advantage over a lead-blast furnace because in the latter the slag must be held within close limits. In my process the slags can range widely in composition.

By employing indirect pre-heating, as in a muffle, fine ore such as slime, or flotation concentrates can be smelted without dusting since the electric furnace uses no blast. Moreover, the slag losses in Cu, Pb, Ag, and Au are negligible. In my tests of the electric furnace treatment of complex zinc ores carrying copper and lead, 17 short tons of slag representing the accumulation of 104 tappings analyzed:

```
Cu _____ 0.065%
Pb _____ 0.050
Ag _____ 0.50 oz. per ton.
Au _____ None.
```

This result was attained (1) by a reductivity in the smelting zone sufficiently intense to reduce the zinc compounds, (2) by having a hot fluid slag through which no blast penetrates, and (3) by the aid of the throbbing and pulsating action of the alternating current.

If a small amount of coke breeze be added to the smelting furnace and if the electrode passes through roof by means of a watercooled stuffing box, the accidental oxidation of the electrodes will be slight and the electrode consumption per ton of ore will not amount to over 4 lbs. per ton.

Having thus revealed this invention, I claim as new and desire to secure the following combinations of elements, or equivalents thereof, by Letters Patent of the United States:—

1. A smelting process which comprehends bringing an acid and a basic ore mixture separately to high temperatures by heat derived from the combustion of fuel; and then associating said mixtures within a closed container and therein subjecting them to smelting conditions by means of internally developed heat.

2. A smelting process which comprehends bringing an acid and a basic ore mixture separately to high temperatures by heat derived from the combustion of fuel; and then associating said mixtures and subjecting them to smelting conditions by means of heat derived from electrical energy within a closed furnace.

3. A process of smelting ores bearing large proportions of copper and lead which comprehends separately heating to a temperature closely approximating the fluxing point an acid and a basic mixture containing said metals by combustion of fuel; and then simultaneously subjecting said pre-heated mixtures to smelting conditions within an electric furnace.

4. A smelting process which comprehends heating to a temperature not less than 1200 degrees C. of oxidized ores in two separate continuous furnaces by means of heat derived from the combustion of fuel; and then introducing said ores into an electric furnace and thereupon raising the temperature thereof to a sufficient degree to effect smelting.

In witness whereof, I hereunto subscribe my name, as attested by the two subscribing witnesses.

WOOLSEY McALPINE JOHNSON.

Witnesses:
 B. COOKE,
 L. LEVIT.